Figure 1:
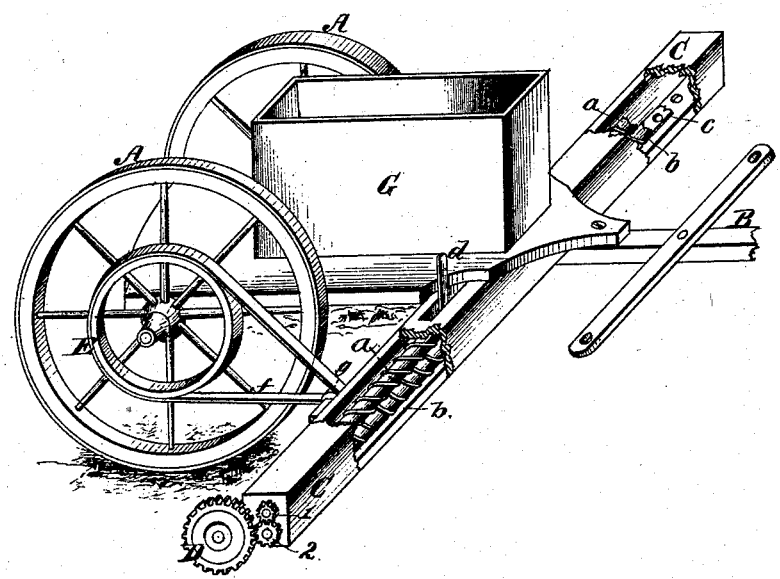

N. A. MONROE.
SEED-SOWING ATTACHMENT FOR WAGONS.

No. 172,146.  Patented Jan. 11, 1876.

Witnesses.  
Arthur Wright  
J. K. Marsh

Inventor.  
Nathaniel A. Monroe,  
Attorney. Thomas J. Orwig.

UNITED STATES PATENT OFFICE.

NATHANIEL A. MONROE, OF MITCHELLVILLE, IOWA, ASSIGNOR OF ONE-HALF HIS RIGHT TO FLAVIUS J. BOYD, OF SAME PLACE.

IMPROVEMENT IN SEED-SOWING ATTACHMENTS FOR WAGONS.

Specification forming part of Letters Patent No. 172,146, dated January 11, 1876; application filed April 16, 1875.

*To all whom it may concern:*

Be it known that NATHANIEL A. MONROE, of Mitchellville, in the county of Polk and State of Iowa, have invented an Improved Seed-Sowing Apparatus, of which the following is a specification:

The object of my invention is to form a seed-sowing apparatus in such a manner that it can be readily attached to the front half of a common farm-wagon, and automatically operate to broadcast seed uniformly and rapidly over a field. It consists in combining a driving-wheel, two pinions, and two right and left worms, with a distributing-tube, seed-box, and carriage, all as hereinafter set forth.

My drawing is a perspective view, illustrating the construction, application, and operation of my invention.

A A represent the wheels of the front part of a common wagon. B is the wagon-tongue. C is my seed-distributing tube attached to and under the carriage in any suitable way. It may be made of wood or sheet metal and vary in form, diameter, and length, as desired. *a* and *b* are two shafts that have their bearings in the ends of the tube C. They are wrapped spirally with wire, or other suitable material, to form right and left worms. C is a common perforated slide-valve, operated by the lever *d*, to open and close the valves in the bottom of the distributing-tube C. Nos. 1 and 2 are pinions, on the ends of the worms or shafts *a* and *b*, actuated by the driving-wheel D. E is a belt-wheel rigidly attached to the spokes of the wheel A, and connected with the driving-wheel D by means of a belt or chain, *f*, running over the pulley *g*, mounted on the shaft of the driving-wheel D. The shaft carrying the driving-wheel D and pulley *g* has its bearings attached to the seed-distributing tube C in any suitable way, and is carried thereby. G is a seed box or hopper mounted on top of the carriage, in a central position relative to the length of the tube C.

In the practical operation of my invention, the seed drops from the hopper G into the middle of the tube C. As the carriage advances the belt *f* communicates power from the wheel A E to the pulley *g* and driving-gear wheel D, which engages and operates the pinions Nos. 1 and 2, and rotates the worms *a* and *b* in reverse directions to convey, and stir, and distribute seeds from the center of the tube C, to drop and broadcast the same uniformly along the entire length of the perforated tube, and so close to the ground that it will not be liable to be carried by the wind. Tubes may be attached to the tube C, in any suitable way, to drill in the seed, when desired.

I am aware that spirally-flanged shafts have been used to convey seed in opposite directions in different compartments of attachments applied and operated in a manner similar to mine. I claim, however, that my manner of placing a right and left worm, or spirally-flanged shaft, in a tube to convey the seed from the center to the ends, and also placing a second right and left worm over the first, and contiguous therewith, in the same tube, to convey surplus seed from the ends toward the center, to prevent clogging, and to aid in the distribution of seed uniformly along the entire length of the distributing-tube, is new and greatly advantageous.

I claim as my invention—

In a seed-sower, the right and left worms and conveyers *a b* in the distributing-tube C, arranged relatively to each other and the seed-box G on the carriage A B, to convey and distribute seed, and to prevent the seed from accumulating and clogging in the ends of the tube, as shown and described.

NATHANIEL A. MONROE.

Witnesses:
  N. W. CRAM,
  H. J. GRISMER.